US008457597B2

(12) United States Patent
Morgan et al.

(10) Patent No.: US 8,457,597 B2
(45) Date of Patent: *Jun. 4, 2013

(54) METHOD FOR AUTHENTICATING A MOBILE UNIT ATTACHED TO A FEMTOCELL THAT OPERATES ACCORDING TO CODE DIVISION MULTIPLE ACCESS

(75) Inventors: Todd C. Morgan, Oak Park, IL (US); Sarvar Patel, Montville, NJ (US); Robin J. Thompson, Batavia, IL (US)

(73) Assignee: Alcatel Lucent, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/428,192

(22) Filed: Mar. 23, 2012

(65) Prior Publication Data
US 2012/0184249 A1    Jul. 19, 2012

Related U.S. Application Data

(63) Continuation of application No. 12/019,903, filed on Jan. 25, 2008.

(51) Int. Cl.
| H04M 1/66 | (2006.01) |
| H04M 3/16 | (2006.01) |
| H04W 4/00 | (2009.01) |
| H04W 36/00 | (2009.01) |
| H04L 9/00 | (2006.01) |
| H04L 29/06 | (2006.01) |
| H04K 1/00 | (2006.01) |
| G06F 21/00 | (2006.01) |
| G06F 7/04 | (2006.01) |
| G06F 17/30 | (2006.01) |

(52) U.S. Cl.
USPC ........ 455/410; 455/411; 455/435.1; 455/444; 380/247; 380/255; 380/277; 713/150; 713/182; 726/2

(58) Field of Classification Search
USPC .............. 455/410–411, 435.1, 444; 370/320, 370/335, 342, 441; 380/44–47, 247–286; 713/150–186; 726/1–21
See application file for complete search history.

(56) References Cited

U.S. PATENT DOCUMENTS

| 6,167,279 A | 12/2000 | Chang et al. ................... 455/462 |
| 6,711,400 B1 * | 3/2004 | Aura .............................. 455/411 |

(Continued)

OTHER PUBLICATIONS

International PCT Search Report PCT/US2008/011099 dated Aug. 3, 2009.
Written Opinion based on International PCT Search Report PCT/US2008/011099 dated Aug. 3, 2009.

(Continued)

*Primary Examiner* — Anthony Addy
*Assistant Examiner* — Michael Mapa
(74) *Attorney, Agent, or Firm* — Williams, Morgan & Amerson (57) ABSTRACT

The present invention provides a method involving a femtocell in communication with an Internet Protocol Multimedia Subsystem (IMS) network. In one embodiment, the femtocell operates according to code division multiple access (CDMA) standards. The method includes receiving, from the femtocell and at a first secure entity in the IMS network, first authentication information generated by the mobile unit using a first random number broadcast by the femtocell in a global challenge. The method also includes receiving, from a second secure entity in the secure network, at least one security key formed based on the global challenge and second authentication information for uniquely challenging the mobile unit. In one embodiment, the second secure entity is a CDMA-based authentication server. The method further includes providing the security key(s) to the femtocell in response to authenticating the mobile unit based upon the second authentication information.

11 Claims, 7 Drawing Sheets

U.S. PATENT DOCUMENTS

2005/0138355 A1* 6/2005 Chen et al. .................... 713/155
2008/0254833 A1* 10/2008 Keevill et al. ................. 455/558

OTHER PUBLICATIONS

Tat Chan: "IMS Security Framework," 3$^{rd}$ Generation Partnership Project 2, [Online] Dec. 8, 2005, pp. 1-35, XP002537840 http://www.3gpp2.org/Public_html/specs/S.S0086-B_v1.0_051213.pdf.

Dolan M: "Text and Requirements proposed to be added to S.P0126, 3GPP2, S10-2007-0913-002r1" 3$^{rd}$ Generation Partnership Project 2 [Online] Sep. 13, 2007, pp. 1-17, XP002537841 URL:ftp://ftp.3gpp2.org/TSGS/Incoming/Femt0%20Cells%20-%20SP0126%work/S10-20070913-002r3_ED_Proposed_Additions_to_S%20P0126.doc.

* cited by examiner

METHOD FOR AUTHENTICATING A MOBILE UNIT ATTACHED TO A FEMTOCELL THAT OPERATES ACCORDING TO CODE DIVISION MULTIPLE ACCESS

This is a continuation of co-pending application Ser. No. 12/019,903 filed Jan. 25, 2008.

CROSS REFERENCE TO RELATED APPLICATIONS

This application is related to U.S. patent application Ser. No. 11/972,262, filed on Jan. 10, 2008, entitled "Method for Authenticating Mobile Units Attached to a Femtocell that Operates According to Code Division Multiple Access."

BACKGROUND OF THE INVENTION

1. Field of the Invention

This invention relates generally to communication systems, and, more particularly, to wireless communication systems.

2. Description of the Related Art

Conventional wireless communication systems use a network of base stations to provide wireless connectivity to one or more mobile units. In some cases, the mobile units may initiate wireless communication with one or more base stations in the network, e.g., when the user of the mobile unit would like to initiate a voice or data call. Alternatively, the network may initiate the wireless communication link with the mobile unit. For example, in conventional hierarchical wireless communications, a server transmits voice and/or data destined for a target mobile unit to a central element such as such as a Radio Network Controller (RNC). The RNC may then transmit paging messages to the target mobile unit via one or more base stations. The target mobile unit may establish a wireless link to one or more of the base stations in response to receiving the page from the wireless communication system. A radio resource management function within the RNC receives the voice and/or data and coordinates the radio and time resources used by the set of base stations to transmit the information to the target mobile unit. The radio resource management function can perform fine grain control to allocate and release resources for broadcast transmission over a set of base stations.

Secure communications in a conventional hierarchical system, such as a CDMA system, are established based on secret information (e.g., an Authentication Key) known only to the mobile unit and a secure entity in the network. The HLR/AuC and the mobile unit may derive shared secret data (SSD) from the Authentication Key (AK), e.g., using the CAVE algorithm. The AK is a 64-bit primary secret key known only to the mobile station and the HLR/AuC. This key is never shared with roaming partners. The AK may be used to generate the SSD, which is a 128-bit secondary key that can be calculated using the CAVE algorithm and can be shared with roaming partners. During authentication, the HLR/AuC and the mobile unit both calculate an Authentication Response separately and independently using shared inputs such as SSD, electronic serial number (ESN), Mobile identity Number (MIN), and a shared Random Number (RAND). If the independently calculated results match up, then authentication is approved and the mobile unit is allowed to register with the network.

The AK or SSD can be used to authenticate mobile units that are registered in the network. For example, a base station may periodically generate a random number (RAND) and broadcast the RAND. Mobile units that receive the broadcast RAND compute an authentication algorithm output (AUTH) using the inputs including the RAND and the AK or SSD. The AUTH and the associated RAND (or selected portions of the RAND) are sometimes referred to as a pair. The mobile unit may then transmit the AUTH/RAND pair to the base station, which may then pass this information through the network on to the HLR/AuC. The HLR/AuC uses the authentication algorithm, the stored value of the AK or SSD, other data corresponding to each mobile unit, and the RAND to calculate the expected value of AUTH. If this value matches the value transmitted by the mobile unit, the mobile unit is authenticated. The base station frequently changes the value of RAND to ensure that the AUTH value is fresh and to reduce the possibility that previously generated AUTH/RAND results may be captured by monitoring the air interface and replayed by a fraudulent mobile unit or mobile unit emulator. This technique is considered reasonably reliable, at least in part because base stations are typically secure devices that are under the control of wireless communication providers.

A unique challenge may also be used to challenge the mobile unit. In a unique challenge, an authentication center generates a unique random number, which may be transmitted to the mobile unit. The mobile unit uses a security algorithm to calculate a unique response to the unique challenge and then transmits information indicating the value of the unique response to the authentication center. The authentication center also executes the security algorithm to generate an expected value of the unique response. If the authentication center determines that the expected value of the unique response is the same as the value provided by the mobile unit, then the mobile unit is authenticated. Otherwise, a possible security violation has occurred. Unique challenges are typically used by systems that are not capable of authenticating on system access, e.g., using global challenges. Unique challenges can also be used as a backup authentication procedure if a valid exchange did not occur upon system access.

One alternative to the conventional hierarchical network architecture is a distributed architecture including a network of access points, such as base station routers, that implement distributed communication network functionality. For example, each base station router may combine RNC and/or PDSN functions in a single entity that manages radio links between one or more mobile units and an outside network, such as the Internet. Compared to hierarchical networks, distributed architectures have the potential to reduce the cost and/or complexity of deploying the network, as well as the cost and/or complexity of adding additional wireless access points, e.g. base station routers, to expand the coverage of an existing network. Distributed networks may also reduce (relative to hierarchical networks) the delays experienced by users because packet queuing delays at the RNC and PDSN of hierarchical networks may be reduced or removed.

At least in part because of the reduced cost and complexity of deploying a base station router, base station routers may be deployed in locations that are impractical for conventional base stations. For example, a base station router may be deployed in a residence or building to provide wireless connectivity to the occupants of the residents of the building. Base station routers deployed in a residence are typically referred to as home base station routers or femtocells because they are intended to provide wireless connectivity to a much smaller area (e.g., a femtocell) that encompasses a residence. However, the functionality in a femtocell is typically quite similar to the functionality implemented in a conventional base station router that is intended to provide wireless connectivity to a macro-cell that may cover an area of approximately a few square kilometers. One important difference between a femtocell and a conventional base station router is that home base station routers are designed to be inexpensive plug-and-play devices that can be purchased off-the-shelf and easily installed by a lay person.

Femtocells do not typically include expensive security chips for storing information that can be used to establish secure communications between the femtocell and mobile units. Furthermore, femtocells are intended to be deployed in unsecured locations, such as a person's home or place of business. Consequently, femtocells are not considered trusted locations for storing secret keys or other information that may be used to authenticate mobile units. A femtocell may therefore be modified to fraudulently represent a mobile unit if femtocells are configured to generate the random numbers RAND used to authenticate mobile units. For example, an illegitimate femtocell may intercept a valid AUTH/RAND pair transmitted between a legitimate mobile unit and a legitimate base station. The illegitimate femtocell may then emulate the legitimate mobile unit using the intercepted AUTH/RAND pair. Since the femtocell is responsible for generating RAND values, the network cannot determine whether or not the AUTH/RAND pair transmitted by the illegitimate femtocell corresponds to a fresh value of RAND.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided involving a femtocell in communication with an Internet Protocol. Multimedia Subsystem (IMS) network.

In one embodiment, the femtocell operates according to code division multiple access (CDMA) standards. The method includes receiving, from the femtocell and at a first secure entity in the IMS network, first authentication information generated by the mobile unit using a first random number broadcast by the femtocell in a global challenge. The method also includes receiving, from a second secure entity in the secure network, at least one security key formed based on the global challenge and second authentication information for uniquely challenging the mobile unit. In one embodiment, the second secure entity is a CDMA-based authentication server. The method further includes providing the security key(s) to the femtocell in response to authenticating the mobile unit based upon the second authentication information.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
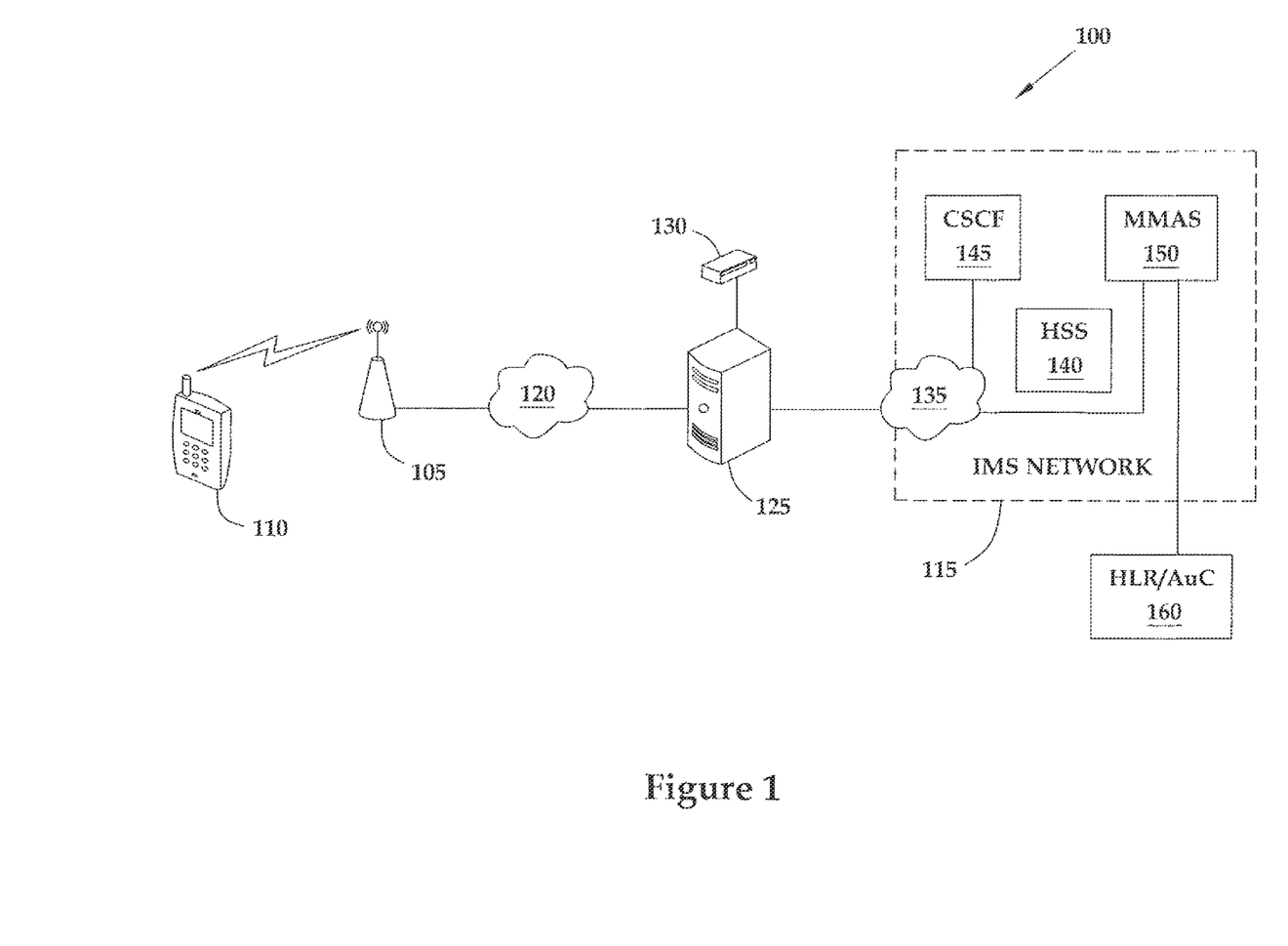
FIG. 1 conceptually illustrates one exemplary embodiment of a wireless communication system, in accordance with the present invention.

FIG. 1 conceptually illustrates one exemplary embodiment of a wireless communication system 100. In the illustrated embodiment, the wireless communication system 100 includes one or more femtocells 105 for providing wireless connectivity. The femtocells 105 may provide wireless connectivity according to standards and/or protocols including, but not limited to, Code Division Multiple Access (CDMA) standards and/or protocols, Universal Mobile Telecommunication Services (UMTS) standards and/or protocols, Global System for Mobile communication (GSM) standards and/or protocols, WiMAX standards and/or protocols, IEEE standards and/or protocols, and the like. Furthermore, persons of ordinary skill in the art having benefit of the present disclosure should appreciate that the present invention is not limited to using femtocells 105 to provide wireless connectivity. In alternative embodiments, devices such as base stations, base station routers, access points, access networks, and the like may be used to provide wireless connectivity in the wireless communication system 100.

The femtocell 105 is intended to provide wireless coverage to an area that approximately encompasses a building that includes one or more mobile units 110 that are granted access to the femtocell 105. The mobile units 110 may be registered with the femtocell 105 using a variety of techniques including having a user enter an International Mobile Subscriber Identity (IMSI) for the registered mobile units 110 via a webpage, using a handshaking protocol between the mobile units 110 and the femtocell 105, and the like. A list of the registered mobile units 110 is then made available to the femtocell 105. In one embodiment, the femtocell 105 contains a database including the IMSI values for the registered mobile units 110. In the illustrated embodiment, the mobile unit 110 is a code division multiple access (CDMA)-based wireless mobile unit 110. However, persons of ordinary skill in the art having benefit of the present disclosure should appreciate that the present invention is not limited to CDMA-based mobile units 110.

The femtocell 105 provides access to the wireless communication system 100 via an Internet Protocol Multimedia Subsystem (IMS) network 115 (indicated by the dashed box). In various alternative embodiments the femtocell 105 may be coupled to the IMS network 115 by a variety of functional elements. For example, in FIG. 1 the femtocell 105 is coupled to a digital subscriber line (DSL) or cable modem network 120, which is coupled to a femto network gateway 125. An Operations Administration and Maintenance (OA & M) server 130 may be coupled to the femto network gateway 125 and may be used to establish communications between the femtocell 105 and an Internet Protocol (IP) network 135 via the femto network gateway (FNG) 125. For example, an IPSec tunnel may be formed between the femtocell 105 and the femto network gateway 125. However, persons of ordinary skill in the art having benefit of the present disclosure should appreciate that this exemplary embodiment is not intended to limit the present invention to this particular network architecture.

The IMS network 115 is a Session Initiation Protocol (SIP) based network that supports communication over the internet by many types of handsets. For example, these handsets (such as the mobile unit 110 combined with the femtocell 105) may use Voice over Internet Protocol (VoIP) and other methods to transfer data and voice in real time applications across the IP network 135. The IMS network 115 includes a Home Subscriber Server (HSS) 140, which is a master user database that supports the IMS network entities that handle calls. The HSS 140 may contain subscription-related information (user profiles), perform authentication and authentication of the user, and can provide information about the user's physical location. The IMS network 115 may also include one or more Call Session Control Function (CSCF) entities 145 that are used to process SIP signaling packets in the IMS network 115.

Although the CSCF entities 145 are shown as a single functional block in FIG. 1, persons of ordinary skill in the art having benefit of the present disclosure should appreciate that the CSCF entities 145 may include multiple entities such as a serving CSCF, a proxy CSCF, an interrogating CSCF, and the like, which may be implemented in one or more other functional and/or physical entities. A Mobility Management Application Server (MMAS) 150 is used to coordinate and manage functions related to the mobility of the mobile units 110.

The femtocell 105 may transmit global challenges to the mobile unit 110 an overhead channel. In one embodiment, the global challenge is based on a global random number that is generated at the femtocell 105. On every system access, mobile units are required to compute a response using secret data (SSD or AK) and to return the response and at least a portion of the random number to the system for verification. The femtocell 105 uses the global random number and the response to authenticate the mobile unit 110 and to establish a secure communication link over the air interface with the mobile unit 110. However, the femtocell 105 may not be a trusted element of the wireless communication system 100. For example, the femtocell 105 may not be physically secure because it may be located in a user's residence or place of business. Consequently, the service provider may not be able to ensure that the femtocell 105 cannot be accessed by an unauthorized user who may attempt to modify or hack the femtocell 105. Furthermore, the femtocell 105 may be susceptible to hacking over a network. For example, the user of the femtocell 105 may not provide sufficient firewall protection, virus protection, and the like, which may permit unauthorized users to hack into the femtocell 105. Since the femtocell 105 is not a trusted element of the system 100, global challenges issued by the femtocell 105 (as well as authentications based on these global challenges) may also be suspect.

In contrast, the entities in the IMS network 115 are trusted or secure entities. For example, the MMAS 150 may be physically secure because it is located in a building that is under the control of the service provider. Consequently, the service provider may be able to ensure that the MMAS 150 cannot be accessed by an unauthorized user who may attempt to modify or hack the femtocell 105. Furthermore, the MMAS 150 may be protected from hacking using firewall protection, virus protection, and the like, which may prevent unauthorized access to the MMAS 150. Other entities in the network, such as a home location register/authentication center (HLR/AuC) 160 that is used to generate and provide one or more keys to the femtocell 105 and/or the mobile unit 110, may also be considered relatively trusted and/or secure because they are under the control of a service provider.

Trusted and/or secure entities within (or securely coupled to) the IMS network 115 may therefore be used to authenticate the mobile unit 110 using a unique challenge that can be issued following a suspect global challenge. In one embodiment, the mobile unit 110 may respond to a (potentially suspect) global challenge issued by the femtocell 105 by forwarding a global authentication response to the IMS network 115, which may verify the global authentication response and generate security information such as a session keys in cooperation with the HLR/AuC 160. The IMS network 115 may then create and send a unique challenge to the mobile unit 110 via the femtocell 105. Upon receiving the unique challenge, the mobile unit 110 generates a unique authentication response that is forwarded to the IMS network 115 for verification. Once the mobile unit 110 has been authenticated by the trusted and/or secure entity, the IMS network 115 may provide call processing services or security information, such as one or more keys generated at the home location register/authentication center (HLR/AuC) 160, to the femtocell 105.

Figure 2:
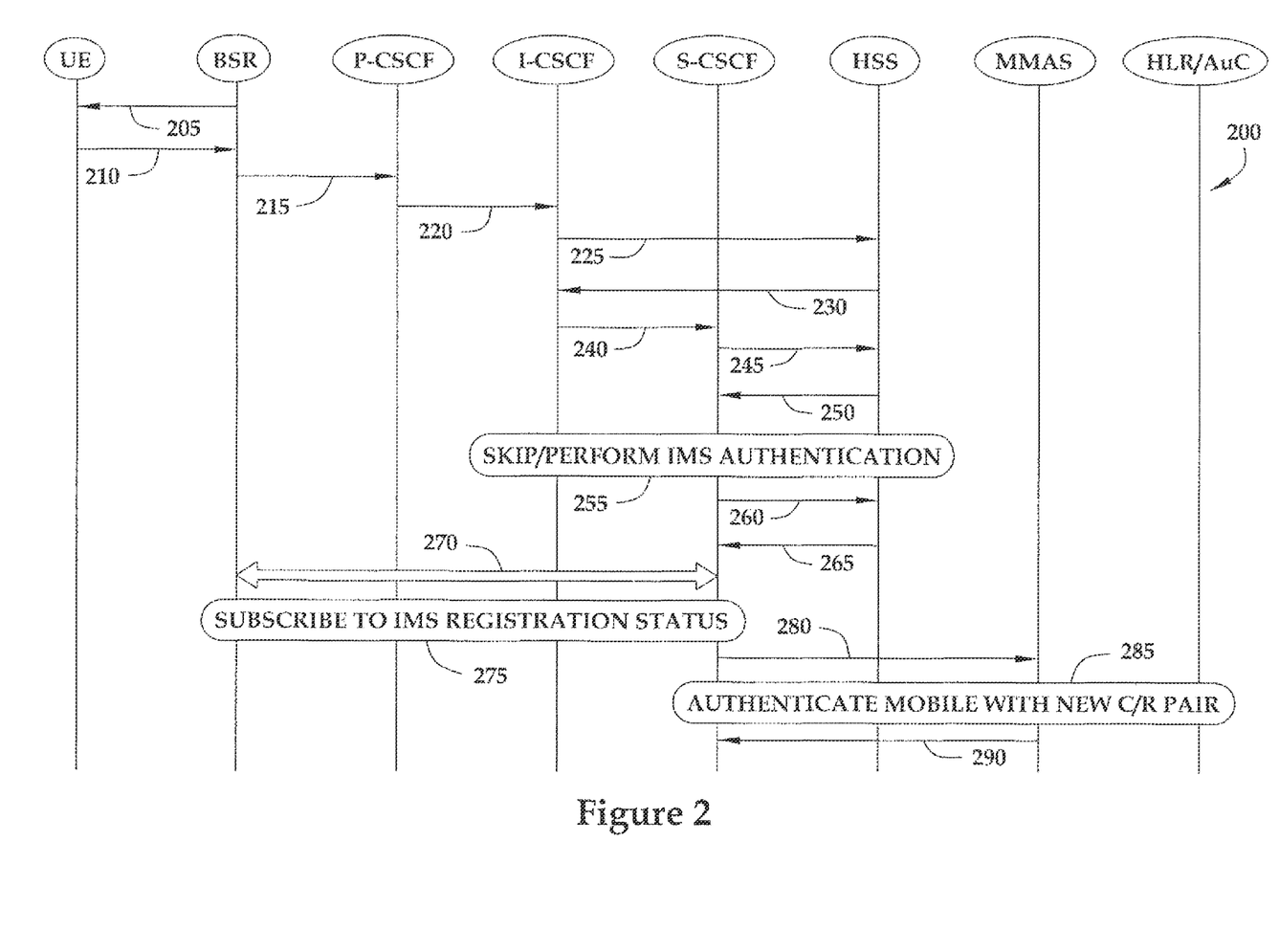
FIG. 2 conceptually illustrates one exemplary embodiment of a method of authenticating a mobile unit by providing a unique challenge when the mobile unit registers, in accordance with the present invention.

FIG. 2 conceptually illustrates one exemplary embodiment of a method 200 of authenticating a mobile unit (UE) by providing a unique challenge when the mobile unit registers with the network. In the illustrated embodiment, a femtocell or base station router (BSR) is used to provide wireless connectivity to the mobile unit. The femtocell is communicatively coupled to an IMS network that includes a serving CSCF (S-CSCF), a proxy CSCF (P-CSCF), an interrogating CSCF (I-CSCF), a home subscriber server (HSS), and a mobility management application server (MMAS). The IMS network is also in communication with a home location register/authentication center (HLR/AuC). Persons of ordinary skill in the art having benefit of the present disclosure should appreciate that the elements shown in FIG. 2 are illustrative and are not intended to limit the present invention. In alternative embodiments, more or fewer elements that perform more or fewer functions may be included.

In the illustrated embodiment, the femtocell creates a global random number (RAND) and broadcasts this random number (RAND) in the overhead message train, as indicated by the arrow 205. The mobile unit calculates a global authentication response (AUTHR) using the global random number and a key such as an SSD key that is known only to the mobile unit and the HLR/AuC. The mobile unit may then send a registration message to the femtocell, as indicated by the arrow 210. The registration message sent by the mobile unit may be a SIP registration message that includes the global random number, the global authentication response, a mobile unit identifier, and an electronic subscriber number. The femtocell forwards the registration message to the P-CSCF, which may then forward the registration message to the I-CSCF, as indicated by the arrows, 215, 220. The I-CSCF may send an interrogation message to the home subscriber server to determine the appropriate S-CSCF for the mobile unit, as indicated by the arrow 225. The home subscriber server replies with information indicating the selected. S-CSCF, as indicated by the arrow 230. The registration message is then forwarded to the selected S-CSCF, as indicated by the arrow 240.

The S-CSCF sends a message to the home subscriber server to ask whether IMS authentication needs to be performed for the mobile unit, as indicated by the arrow 245. For example, the S-CSCF may send (at 245) a mobile authentication request (MAR) to the home subscriber server. The home subscriber server then returns information indicating whether or not IMS authentication needs to be performed for the mobile unit, as indicated by the arrow 250. If the message from the home subscriber server indicates that it is not necessary to authenticate the mobile unit, then IMS authentication may be skipped (at 255). If the message from the home subscriber server indicates that it is necessary to authenticate the mobile unit, then IMS authentication may be performed with a User Agent at the femtocell (at 255). In either case, the S-CSCF transmits a request for a mobile unit service profile to the home subscriber server, as indicated by the arrow 260, and the home subscriber server returns the service profile for the mobile unit to the S-CSCF, as indicated by the arrow 265. If the IMS authentication step was skipped, then the S-CSCF tells the femtocell that registration is complete (e.g., by transmitting a 200-OK message) and the femtocell may respond with an acknowledgment message, as indicated by the double arrows 270.

In one embodiment, the femtocell may subscribe (at 275) to its IMS registration status, e.g., by transmitting an SUBSCRIBE message to the S-CSCF, which may return a message (such as a 200-OK message) confirming the subscription. If the CDMA authentication of the mobile unit fails later in the challenge/response sequence, then the mobility management application server can inform the S-CSCF that the IMS registration has failed, e.g., by providing a 4xx failure message instead of a 200-OK message. Since the mobility management application server receives the registration message as a third party registration message based on an initial filter criteria in the user profile stored at the S-CSCF, the registration failure message may cause the S-CSCF to de-register the mobile unit. De-registration of the mobile unit may mean that the previously completed IMS registration would be torn down. A user agent at the femtocell should receive a notification when the registration is torn down since the femtocell subscribed to changes in its IMS registration status. Thus, the user agent at the femtocell is in a position to clean up whatever needs to be cleaned up. In one embodiment, the user agent may commit suicide.

The S-CSCF may send a registration message to the mobility management application server, as indicated by the arrow 280. In one embodiment, the S-CSCF sends (at 280) a SIP third party registration message that includes information indicating the mobile unit identifier, the electronic serial number, the authentication response, and the global random number. In response to receiving the registration message, the mobility management application server authenticates (at 285) the mobile unit using a unique challenge/response pair provided by the HLR/AuC. Results of the authentication procedure are then transmitted to the S-CSCF a message, such as a 200-OK registration message, as indicated by the arrow 290.

Figure 3:
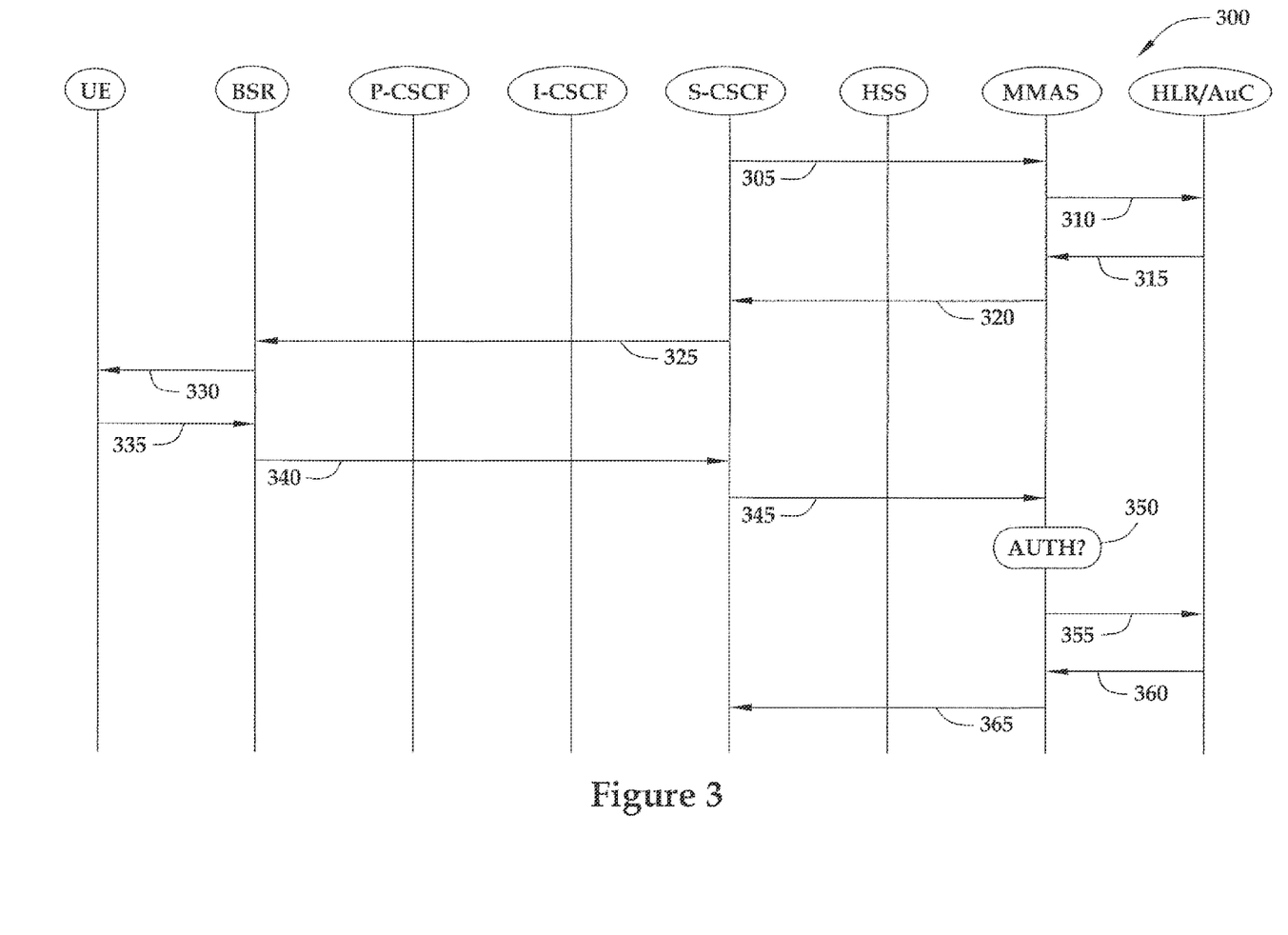
FIG. 3 conceptually illustrates one exemplary embodiment of a method of authenticating a mobile unit based on a unique challenge during mobile unit registration, in accordance with the present invention.

FIG. 3 conceptually illustrates one exemplary embodiment of a method 300 of authenticating a mobile unit based on a unique challenge during mobile unit registration. Some or all of the method 300 may be implemented as part of the step 285 depicted in FIG. 2. In the illustrated embodiment, the S-CSCF sends a registration message such as a SIP third party registration message to the mobility management application server, as indicated by the arrow 305. In response to receiving the registration message, the mobility management application server requests a unique challenge/response pair that may be used to authenticate the mobile unit. For example, the mobility management application server may function like a visitor location register (VLR) and send an authentication request for the unique challenge/response pair to the HLR/AuC, as indicated by the arrow 310. The HLR/AuC may then return the requested unique challenge/response pair, such as a unique random number (RANDU) and a unique authentication response (AUTHU).

The mobility management application server can challenge the mobile unit using the provided unique challenge/response pair. In the illustrated embodiment, the mobility management application server forwards a message, such as a SIP message to the S-CSCF, which forwards the message to the femtocell, as indicated by the arrows 320, 325. The message includes the unique challenge represented by the unique random number generated by the HLR/AuC for the mobile unit. The femtocell then forms a unique challenge message using the received unique challenge random number and transmits it to the mobile unit, as indicated by the arrow 330. Upon receipt of the unique challenge, the mobile unit generates a unique authentication response (AUTHU) using the provided unique random number and a security key known to the mobile unit. The mobile unit returns a challenge response message including the unique random number and the computed authentication response (RANDU/AUTHU) to the femtocell, as indicated by the arrow 335. The femtocell may then transmit the computed authentication response (AUTHU) to the S-CSCF, which may for this response to the mobility management application server, as indicated by the arrows 340, 345. For example, the computed authentication response may be transmitted in a 200-OK response message.

The mobility management application server may authenticate (at 350) the mobile unit using the authentication response values provided by the mobile unit and the HLR/AuC. In one embodiment, the mobility management application server compares (at 350) the authentication response values provided by the mobile unit and the HLR/AuC and authenticate (at 350) the mobile unit if these two values match. If the mobile unit is successfully authenticated (at 350), then the mobility management application server transmits a registration notification to the HLR/AuC, as indicated by the arrow 355. The HLR/AuC may transmit a confirmation in response to receiving the registration notification, as indicated by the arrow 360. In one embodiment, the confirmation 360 may include a visitor location register profile associated with the mobile unit.

If the mobile unit has been successfully authenticated (at 350) and registered (at 355, 360), then the mobility management application server may transmit a registration acknowledgment message to the S-CSCF, as indicated by the arrow 365. For example, the mobility management application server may transmit (at 365) a 200-OK message that indicates that the registration and authentication of the mobile unit has been successful. In one embodiment, the S-CSCF may proceed to perform such tasks as using its list of rules to determine whether or not any other application servers are supposed to be notified in the event that the mobile unit is successfully registered. However, persons of ordinary skill in the art having benefit of the present disclosure should appreciate that determining whether to notify other application servers is only one example of an intelligent network "trigger" and the list of rules on the S-CSCF are examples of instructions that may be used to determine when to fire these triggers. In one embodiment, the triggers provide application servers with the opportunity to process one or more SIP messages.

Figure 4:
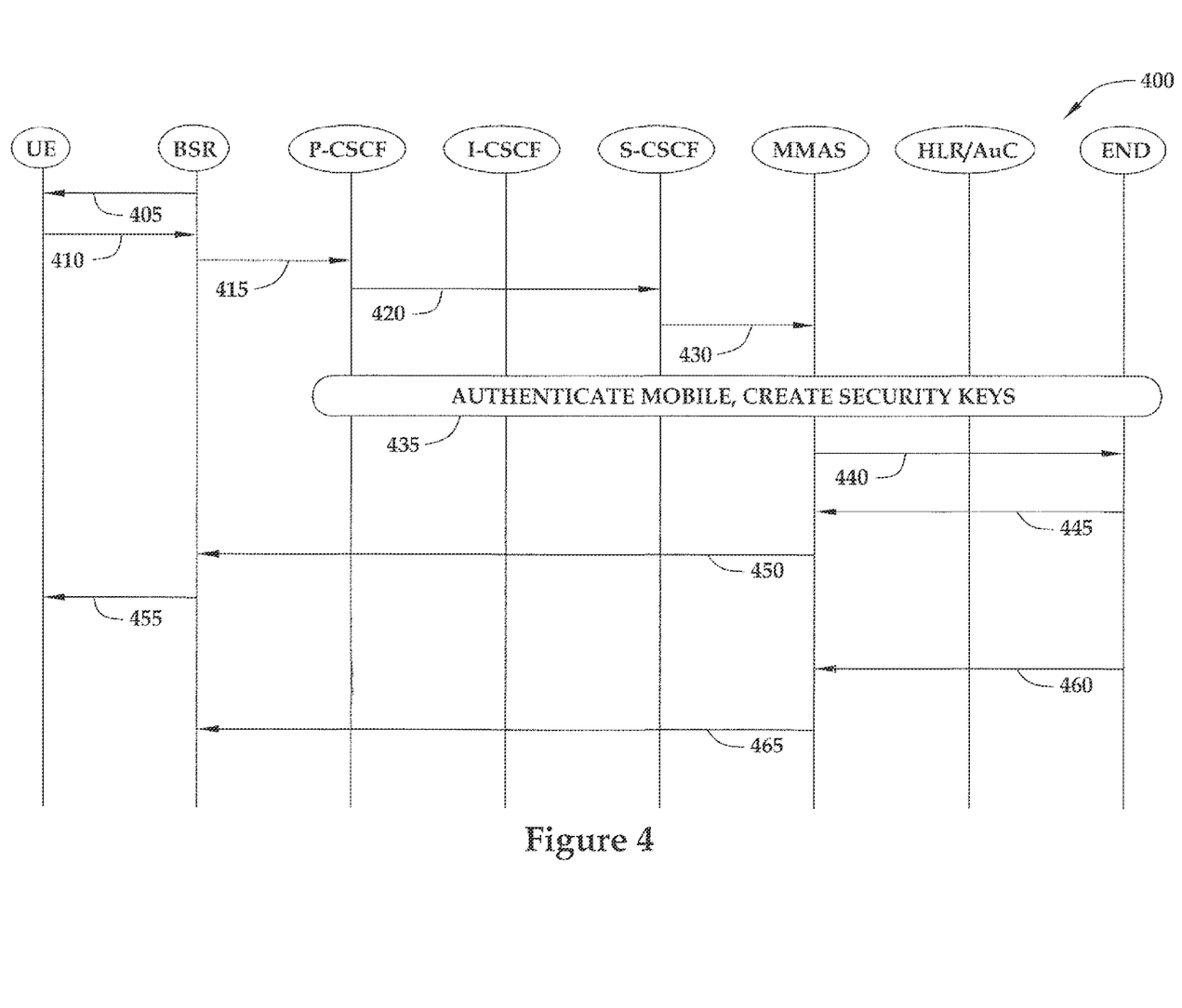
FIG. 4 conceptually illustrates one exemplary embodiment of a method of authenticating a mobile unit by providing a unique challenge in response to mobile unit origination, in accordance with the present invention.

FIG. 4 conceptually illustrates one exemplary embodiment of a method 400 of authenticating a mobile unit (UE) by providing a unique challenge in response to mobile unit origination. In the illustrated embodiment, a femtocell or base station router (BSR) is used to provide wireless connectivity to the mobile unit. The femtocell is communicatively coupled to an IMS network that includes a serving CSCF (S-CSCF), a proxy CSCF (P-CSCF), an interrogating CSCF (I-CSCF), and a mobility management application server (MMAS). The IMS network is also in communication with a home location register/authentication center (HLR/AuC) and another end user (END), such as another mobile unit or other communication device. Persons of ordinary skill in the art having benefit of the present disclosure should appreciate that the elements shown in FIG. 4 are illustrative and are not intended to limit the present invention. In alternative embodiments, more or fewer elements that perform more or fewer functions may be included.

In the illustrated embodiment, the femtocell creates a global random number (RAND) and broadcasts this random number (RAND) in the overhead message train, as indicated by the arrow 405. The mobile unit calculates a global authentication response (AUTHR) using the global random number and a key such as an SSD key that is known only to the mobile unit and the authentication center (AuC). If the mobile unit wants to originate service, the mobile unit may send an origination message to the femtocell, as indicated by the arrow 410. For example, the mobile unit may transmit (at 410) a CDMA origination message including the global random number, the authentication response, a mobile unit identifier, and an electronic subscriber number. The mobile unit may also transmit the dialed digits of the other end-user. The femtocell forms an invitation message and forwards the invitation message to the P-CSCF, which may then forward the invitation message to the I-CSCF, as indicated by the arrows, 415, 420. In one embodiment, the invitation message is a SIP INVITE message that includes the global random number, the authentication response, a mobile unit identifier, and an electronic subscriber number. The S-CSCF may then forward the invitation message to the mobility management application server, as indicated by the arrow 430.

Upon receipt of the invitation message, the mobility management application server attempts (at 435) to authenticate the mobile unit and may also create one or more security keys, such as an SMEKEY and/or a PLCM key that may be used for encrypting messages or voice traffic. In one embodiment, the steps that are used to authenticate the mobile unit and create the CDMA encryption keys may be performed concurrently and/or synchronously. However, persons of ordinary skill in the art having benefit of the present disclosure should appreciate that the steps may alternatively be distributed within the flow of call setup messages to attempt to optimize the procedure. For example, a unique challenge could be derived prior to the call and stored by the mobility management application server for immediate use at the call time. If the mobile unit is successfully authenticated (at 435) and the mobility management application server may transmit an invitation message to the end user (END), as indicated by the arrow 440. For example, the mobility management application server may transmit (at 440) an INVITE message to the end-user. A response message, such as a 180-Ringing message, may then be returned to the mobility management application server, which may forward this message to the mobile unit via the femtocell, as indicated by the arrows 445, 450. An audible ringing message may also be provided to the mobile unit, as indicated by the arrow 455. A message indicating that the user has answered the call, such as a 200-OK-Answer message, may be transmitted to the femtocell via the mobility management application server if the end-user accepts the call, as indicated by the arrows 460, 465.

Figure 5:
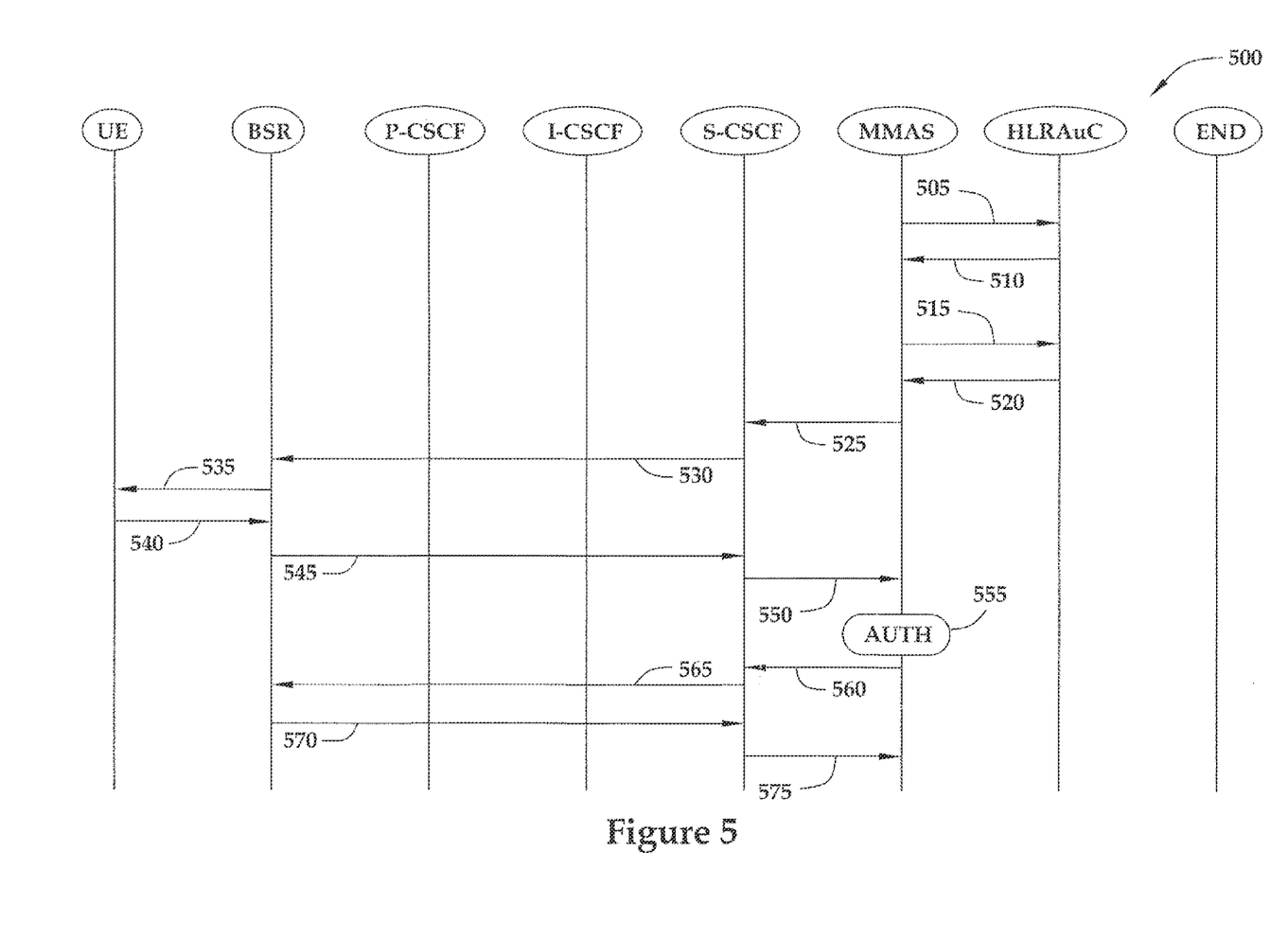
FIG. 5 conceptually illustrates one exemplary embodiment of a method of authenticating a mobile unit based on a unique challenge during mobile unit origination, in accordance with the present invention.

FIG. 5 conceptually illustrates one exemplary embodiment of a method 500 of authenticating a mobile unit based on a unique challenge during mobile unit origination. Some or all of the method 500 may be implemented as part of the step 435 depicted in FIG. 4. In response to receiving an origination requests, such as a SIP INVITE message, the mobility management application server sends an authentication request to the HLR/AuC, as indicated by the arrow 505. In one embodiment, the authentication request includes the global random number, the global authentication response computed by the mobile unit, some or all of the dialed digits corresponding to the other end user, a mobile unit identifier, the electronic serial number, and any other information. The HLR/AuC may then provide security information such as the SMEKEY and/or PLCM key associated with the originated call, as indicated by the arrow 510. The mobility management application server may also transmit an authentication request to the HLR/AuC, as indicated by the arrow 515. The authentication request includes a request for a unique challenge/response pair associated with the originating mobile unit. The HLR/AuC may then return (at 520) the requested challenge/response pair, which may be a unique random number (RANDU) and a corresponding unique authentication response (AUTHU).

The mobility management application server may then forward a unique challenge including the unique random number to the S-CSCF, which may forward the unique challenge to the femtocell, as indicated by the arrows 525, 530. The femtocell may use the provided unique random number to issue a unique challenge to the mobile unit, as indicated by the arrow 535. In response to the unique challenge, the mobile unit may compute an authentication response using the provided unique random number and a security key stored on the mobile unit. The unique authentication response may then be transmitted back to the femtocell, as indicated by the arrow 540. The femtocell may then transmit the computed authentication response (AUTHU) to the S-CSCF, which may forward this response to the mobility management application server, as indicated by the arrows 545, 550. For example, the computed authentication response and the unique random number may be transmitted in a 200-OK response message.

The mobility management application server may authenticate (at 555) the mobile unit using the unique authentication response values provided by the mobile unit and the authentication center. In one embodiment, the mobility management application server compares (at 555) the authentication response values provided by the mobile unit and the authentication center and authenticate (at 555) the mobile unit if these two values match. If the mobile unit is successfully authenticated (at 555), then the mobility management application server may transmit security information for the call to the femtocell via the S-CSCF, as indicated by the arrows 560, 565. For example, the mobility management application server may transmit (at 560, 565) a 200-OK message that indicates that the registration and authentication of the mobile unit has been successful and includes the previously determined SMEKEY and/or PLCM key. At this point the femtocell has the encryption keys that may be used to encrypt the traffic channel for the call. The femtocell may confirm receipt of the security information by transmitting a message back to the mobility management application server, as indicated by the arrows 570, 575. For example, the femtocell may transmit (at 570, 575) a 200-OK message to the mobility management application server.

Figure 6A:
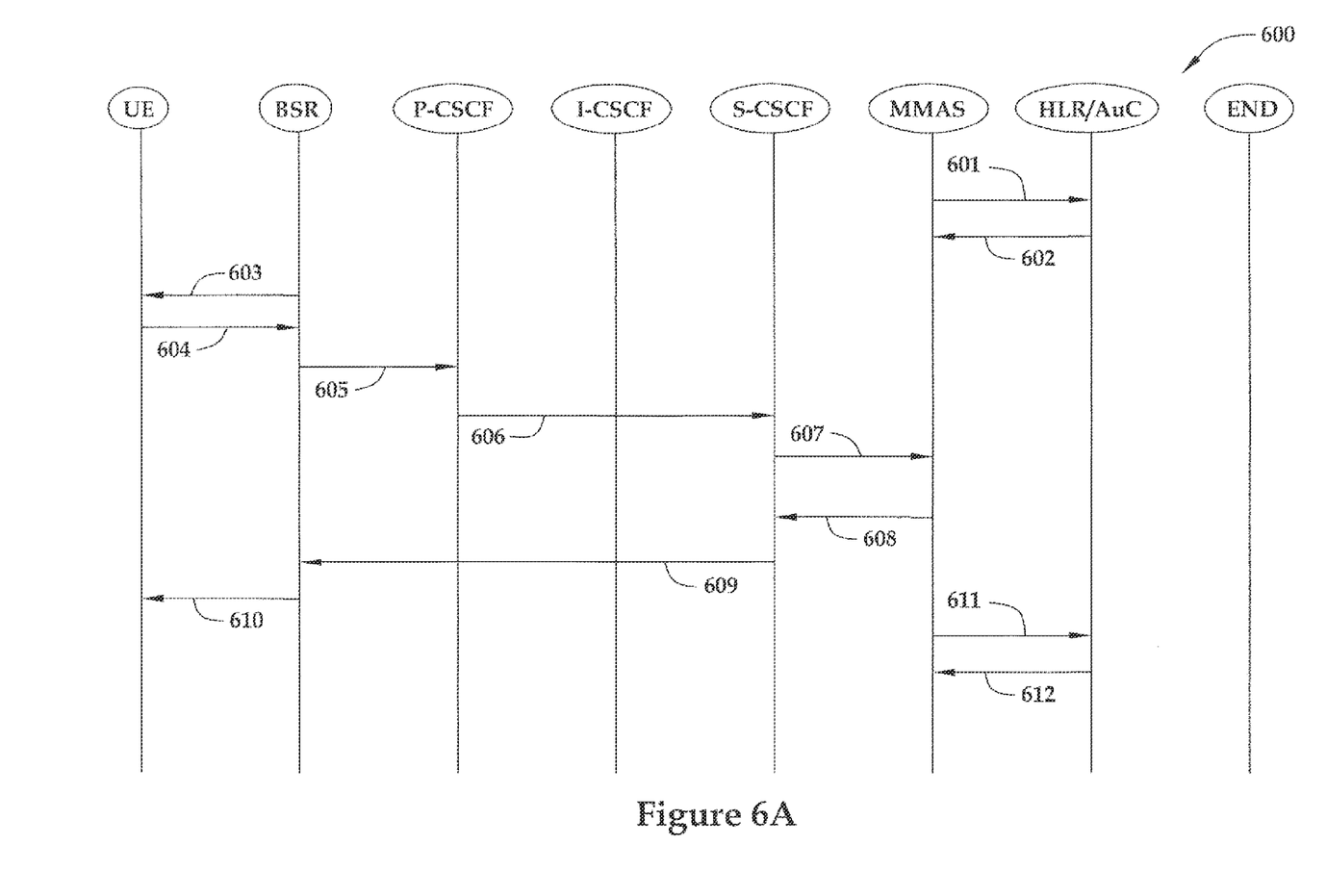
FIGS. 6A and 6B conceptually illustrate one alternative exemplary embodiment of a method of authenticating a mobile unit based on a unique challenge, in accordance with the present invention.
Figure 6B:
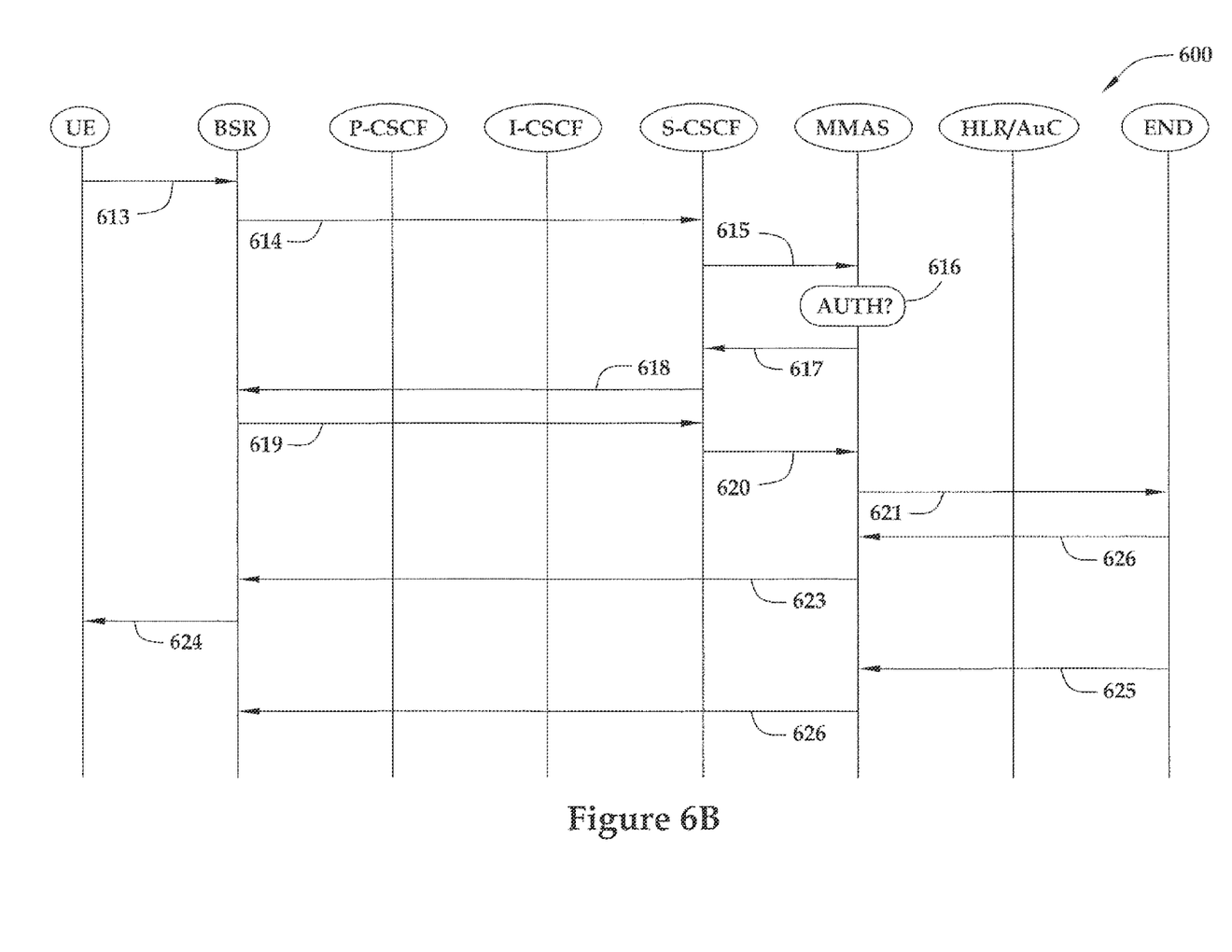

FIGS. 6A and 6B conceptually illustrate one alternative exemplary embodiment of a method 600 of authenticating a mobile unit based on a unique challenge. In the illustrated embodiment, a femtocell or base station router (BSR) is used to provide wireless connectivity to the mobile user equipment (UE). The femtocell is communicatively coupled to an IMS network that includes a serving CSCF (S-CSCF), a proxy CSCF (P-CSCF), an interrogating CSCF (I-CSCF), and a mobility management application server (MMAS). The IMS network is also in communication with a home location register/authentication center (HLR/AuC) and another end user (END), such as another mobile unit or other communication device. Persons of ordinary skill in the art having benefit of the present disclosure should appreciate that the elements shown in FIGS. 6A and 6B are illustrative and are not intended to limit the present invention. In alternative embodiments, more or fewer elements that perform more or fewer functions may be included.

The mobility management application server sends an authentication request to the authentication center, as indicated by the arrow 601. In one embodiment, the authentication request may include, a mobile unit identifier, the electronic serial number, and any other information. The HLR/AuC may then respond with a message that includes information that can be used to later form a unique challenge to the mobile unit. In the illustrated embodiment, the request (at 601) and response (at 602) are performed prior to the mobile unit requesting access to the system, e.g., during a registration request or an origination request. For example, the request (at 601) and response (at 602) may be performed during a previous system access by the mobile unit and the unique authentication information (e.g., the RANDU/AUTHU pair) may be stored at the MMAS until the mobile unit requests access to the system.

In the illustrated embodiment, the femtocell periodically creates a global random number (RAND) and broadcasts this random number (RAND) in the overhead message train, as indicated by the arrow 603. The mobile unit may then calculate an authentication response (AUTHR) using the global random number and a key such as an SSD key that is known only to the mobile unit and the authentication center (AuC). If the mobile unit wants to originate service, the mobile unit may send an origination message to the femtocell, as indicated by the arrow 604. For example, the mobile unit may transmit (at 604) a CDMA origination message including the global random number, the authentication response, a mobile unit identifier, and an electronic subscriber number. The mobile unit may also transmit the dialed digits of the other end-user. The femtocell forms an invitation message and forwards the invitation message to the P-CSCF, which may then forward the invitation message to the S-CSCF, as indicated by the arrows, 605, 606. In one embodiment, the invitation message is a SIP INVITE message that includes the global random number, the authentication response, a mobile unit identifier, and an electronic subscriber number. The S-CSCF may then forward the invitation message to the mobility management application server, as indicated by the arrow 607.

The mobility management application server may then forward a challenge including the unique random number to the S-CSCF, which may forward the challenge to the femtocell, as indicated by the arrows 608, 609. Since the unique authentication information has already been calculated and stored, the MMAS can transmit (at 608) the unique challenge directly in response to receiving the invitation message, instead of having to first request the unique challenge information from the AuC. The femtocell may use the provided unique random number (RANDU) to issue a unique challenge to the mobile unit, as indicated by the arrow 610. The mobility management application server may also send an authentication request to the authentication center, as indicated by the arrow 611. In one embodiment, the authentication request may include the global random number, the global authentication response computed by the mobile unit, a mobile unit identifier, the electronic serial number, and any other information. The authentication, center may then provide security information such as the SMEKEY and/or PLCM key associated with the originated call, as indicated by the arrow 612. The request for the security information (at 611) and the response including the security information (at 612) may be performed concurrently with some or all of the steps 608, 609, 610.

In response to the unique challenge (at 610), the mobile unit may compute an authentication response using the provided unique random number and a secret key stored on the mobile unit. The unique authentication response may then be transmitted back to the femtocell, as indicated by the arrow 613. The femtocell may then transmit the computed authentication response (AUTHU) to the S-CSCF, which may forward this response to the mobility management application server, as indicated by the arrows 614, 615. For example, the computed authentication response and the unique random number may be transmitted in a 200-OK response message.

The mobility management application server may authenticate (at 616) the mobile unit using the authentication response (AUTHU) values provided by the mobile unit and the authentication center. In one embodiment, the mobility management application server compares (at 616) the authentication response values provided by the mobile unit and the authentication center and authenticate (at 616) the mobile unit if these two values match. If the mobile unit is successfully authenticated (at 616), then the mobility management application server may transmit security information for the call to the femtocell via the S-CSCF, as indicated by the arrows 617, 618. For example, the mobility management application server may transmit (at 617, 618) a 200-OK message that indicates that the registration and authentication of the mobile unit has been successful and includes the previously determined SMEKEY and/or PLCM key. At this point the femtocell has the encryption keys that may be used to encrypt the traffic channel for the call. The femtocell may confirm receipt of the security information by transmitting a message back to the mobility management application server, as indicated by the arrows 619, 620. For example, the femtocell may transmit (at 619, 620) a 200-OK message to the mobility management application server.

In some cases, it is possible that an SSD update may have occurred between creation of the authentication information (at 601, 602) and authentication (at 616) of the mobile unit. If this occurs and a fresh set of AUTHU/RANDU data is not retrieved from the HLR/AuC, the mobile unit will not be authenticated, even if it returns the right AUTHU. However, the SSD updates happen through the femtocell serving system, which is the MMAS in this case. Thus, the MMAS would be involved and know it must get a fresh RANDU/AUTHU pair. When the update happens through the macrocell (e.g., because the handset has moved from the femto cell to the macro cell), the update should cause a registration at the HLR/AuC and a notice of deregistration should be sent to the former VLR, which is the MMAS. The MMAS would therefore know that its current pair is not fresh so that when the handset registers back with the femto cell, the MMAS can get a fresh RANDU/AUTHU which would be used during call next system access.

Once the mobile unit has been successfully authenticated (at 616) the mobility management application server may transmit an invitation message to the end user (END), as indicated by the arrow 621. For example, the mobility management application server may transmit (at 621) an INVITE message to the end-user. A response message, such as a 180-Ringing message, may then be returned to the mobility management application server, which may forward this message to the mobile unit via the femtocell, as indicated by the arrows 622, 623. An audible ringing message may then be transmitted to the mobile unit, as indicated by the arrow 624. A message indicating that the user has answered the call, such as a 200-OK-Answer message, may be transmitted to the femtocell via the mobility management application server if the end-user accepts the call, as indicated by the arrows 625, 626.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed is:

1. A first secure entity configurable for use in a secure network, wherein the first secure entity is configurable to:
   authenticate a mobile unit using a global authentication response received from a femtocell, wherein the global authentication response is generated by the mobile unit using a first security key and a first random number, wherein the first security key is unknown to the femtocell;
   acquire at least one second security key formed based on the global challenge;
   transmit, to the mobile unit via the femtocell, a unique challenge comprising a second random number;
   receive, from the femtocell, a unique challenge response generated by the mobile unit using the second random number and the first security key; and
   provide said at least one second security key to the femtocell in response to authenticating the mobile unit based on the second random number.

2. The first secure entity of claim 1, wherein the first secure entity is configurable to authenticate the mobile unit using a global authentication response comprising information indicating an identifier uniquely identifying the first mobile unit, the first random number, and an authentication response computed by the mobile unit based on the first random number and the first security key known by the mobile unit and not known by the femtocell.

3. The first secure entity of claim 2, wherein the first secure entity is configurable to provide the second random number to the femtocell so that the femtocell can transmit the unique challenge including the second random number to the mobile unit.

4. The first secure entity of claim 3, wherein the first secure entity is configurable to receive, in response to providing the second random number, information indicating the second random number and an authentication response computed by the mobile unit based on the second random number.

5. The first secure entity of claim 4, wherein the first secure entity is configurable to authenticate the mobile unit if the authentication response computed by the mobile unit based on the second random number corresponds to the authentication response received from a second secure entity.

6. The first secure entity of claim 1, wherein the first secure entity is configurable to request at least one second security key from a second secure entity, and wherein requesting said at least one second security key comprises requesting session keys for encryption of signaling and bearer traffic.

7. A femtocell configurable to: broadcast a first random number in a global challenge; receive a global authentication response that is generated by a mobile unit using a first security key and the first random number, wherein the first security key is unknown to the femtocell; transmit, to the mobile unit, a unique challenge comprising a second random number received from a first secure entity in a secure network; transmit, to the first secure entity, a unique challenge response generated by the mobile unit using the second random number and the first security key; and receive at least one second security key from the first secure entity in response to authentication of the mobile unit based on the second random number and wherein the second security key is formed based on the global challenge.

8. The femtocell of claim 7, wherein the femtocell operates according to code division multiple access (CDMA) standards, and wherein the femtocell is configured to communicate with an Internet Protocol Multimedia Subsystem (IMS) network.

9. The femtocell of claim 8, wherein the femtocell is configurable to form the unique challenge using information indicating the second random number.

10. The femtocell of claim 8, wherein the femtocell is configured to request at least one of a SMEKEY or a Public Long Code Mask key from a CDMA-based authentication server in the IMS network.

11. A wireless communication system, comprising:
at least one mobile unit;
at least one femtocell configurable to:
broadcast a first random number in a global challenge;
receive a global authentication response that is generated by said at least one mobile unit using a first security key and the first random number, wherein the first security key is unknown to the femtocell;
transmit, to said at least one mobile unit, a unique challenge comprising a second random number;
transmit a unique challenge response generated by the mobile unit using the second random number and the first security key; and
receive at least one second security key in response to authentication of the mobile unit based on the second random number;
at least one first secure entity configurable to:
authenticate said at least one mobile unit using a global authentication response received from the femtocell, wherein the global authentication response is generated by said at least one mobile unit using a first security key and a first random number, wherein the first security key is unknown to the femtocell;
acquire at least one second security key formed based on the global challenge;
transmit, to said at least one mobile unit via the femtocell, a unique challenge comprising a second random number;
receive, from the femtocell, a unique challenge response generated by said at least one mobile unit using the second random number and the first security key; and
provide said at least one second security key to the femtocell in response to authenticating the mobile unit based on the second random number; and
at least one second secure entity for generating and providing said at least one second security key.

* * * * *